US008869831B2

(12) United States Patent
Haehn et al.

(10) Patent No.: US 8,869,831 B2
(45) Date of Patent: Oct. 28, 2014

(54) VARIABLE CONFIGURATION TRACTION VALVE

(75) Inventors: Craig S. Haehn, Avon Lake, OH (US); Chris J. Polmear, Southfield, MI (US); Charles E. Ross, Nova, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 744 days.

(21) Appl. No.: 13/115,660

(22) Filed: May 25, 2011

(65) Prior Publication Data
US 2012/0298234 A1 Nov. 29, 2012

(51) Int. Cl.
*B60T 8/36* (2006.01)
*B60T 8/48* (2006.01)

(52) U.S. Cl.
CPC .............. *B60T 8/361* (2013.01); *B60T 8/4818* (2013.01)
USPC .............. 137/596.16; 137/596.18; 303/113.2; 303/119.2

(58) Field of Classification Search
USPC ...................... 303/113.2–113.4, 118.1, 119.2; 137/596.16, 596.18
See application file for complete search history.

(56) References Cited

U.S. PATENT DOCUMENTS

| | | | |
|---|---|---|---|
| 4,725,101 A | 2/1988 | Szudy et al. | |
| 4,878,513 A * | 11/1989 | Ashby et al. | 137/102 |
| 5,342,119 A | 8/1994 | Smith et al. | |
| 5,425,572 A * | 6/1995 | Koelzer et al. | 303/69 |
| 6,179,391 B1 | 1/2001 | Eberling et al. | |
| 6,386,649 B1 | 5/2002 | Ross | |
| 6,588,856 B2 | 7/2003 | Herbst et al. | |
| 7,357,023 B2 | 4/2008 | Parris et al. | |
| 7,571,738 B2 * | 8/2009 | Ho et al. | 137/102 |
| 7,658,453 B2 | 2/2010 | Soupal | |
| 7,780,245 B2 | 8/2010 | Ho | |
| 2007/0029873 A1 | 2/2007 | Howell | |
| 2009/0045671 A1 * | 2/2009 | Ho | 303/3 |

OTHER PUBLICATIONS

Bendix Commercial Vehicle Systems LLC, "Bendix® TRR-6™ and ATR-3™ Antilock Traction Relay Valves" Service Data Sheet SD-13-4861 (copyright 2008).

* cited by examiner

*Primary Examiner* — Craig Schneider
(74) *Attorney, Agent, or Firm* — Reising Ethington P.C.

(57) ABSTRACT

A traction valve is provided for use in combination with a relay valve. The traction valve includes a body configured for connection to a housing of the relay valve and defining inlet, outlet and traction supply ports. A first fluid control valve used for traction control is supported on the body and includes a valve member that alternately permits and prevents fluid communication between the traction supply and outlet ports in the body. The body and the first fluid control valve are configured to receive any of a plurality of interchangeable second fluid control valves between the inlet port in the body and the first fluid control valve. Each of the plurality of interchangeable second fluid control valves is configured to perform a different function such that the traction valve assumes different configurations upon assembly of the various second fluid control valves with the body and the first fluid control valve.

17 Claims, 3 Drawing Sheets

VARIABLE CONFIGURATION TRACTION VALVE

BACKGROUND OF THE INVENTION

1. Field of the Invention

This invention relates to traction valves and, in particular, to a traction valve used with a relay valve and capable of assuming a plurality of different configurations through assembly with multiple fluid control valves having different functions.

2. Discussion of Related Art

A conventional traction valve is used to provide traction control (differential braking) and anti-lock braking functions by providing controlled delivery of fluid to braking systems during traction control events such as when the torque commanded by the driver is too great given road surface conditions. One conventional combined traction and relay control valve is the ATR-6™ Antilock Traction Relay Valve offered for sale by Bendix Commercial Vehicle Systems LLC. The ATR-6 includes a cover assembly that is mounted onto the relay valve housing. The cover assembly includes a solenoid valve that is used to provide fluid to service brakes during a traction control event. The ATR-6 forms part of a larger fluid network of fluid controlled and electrically control valves that control the flow of fluid between fluid sources and brakes and other fluid controlled systems. Although the ATR-6 and conventional fluid networks function well for their intended purpose, the multiplicity and varied functionality of the valves in the fluid network creates a relatively complex system and challenges relating to on-vehicle packaging and a multiplicity of points at which fluid communication may be disrupted.

The inventors herein have recognized a need for a traction valve that will minimize and/or eliminate one or more of the above-identified deficiencies.

SUMMARY OF THE INVENTION

The present invention provides a traction valve.

A traction valve in accordance with one embodiment of the invention includes a body defining an inlet port, an outlet port, and a traction supply port. The outlet port is configured for fluid communication with a fluid chamber defined in a housing of a relay valve. The traction valve further includes a first fluid control valve supported on the body. The first fluid control valve includes a valve member configured to move between a first position preventing fluid communication between the traction supply port and the outlet port and a second position permitting fluid communication between the traction supply port and the outlet port. The body and the first fluid control valve are configured to receive any of a plurality of interchangeable second fluid control valves between the inlet port in the body and the first fluid control valve. Each of the plurality of interchangeable second fluid control valves is configured to perform a different function such that the traction valve assumes a first configuration upon assembly of one valve of the plurality of interchangeable second fluid control valves with the body and the first fluid control valve and a second configuration, different from the first configuration, upon assembly of another valve of the plurality of interchangeable second fluid control valves with the body and the first fluid control valve.

A traction valve in accordance with another embodiment of the invention includes a body defining an inlet port, an outlet port, and a traction supply port. The outlet port is configured for fluid communication with a fluid chamber defined in a housing of a relay valve. The traction valve further includes a first fluid control valve supported on the body. The first fluid control valve includes a valve member configured to move between a first position preventing fluid communication between the traction supply port and the outlet port and a second position permitting fluid communication between the traction supply port and the outlet port. The traction valve further includes a second fluid control valve disposed between the body and the first fluid control valve. The second fluid control valve includes a housing defining a first port configured for fluid communication with the inlet port of the body, a second port configured for fluid communication with the outlet port of the body through the first fluid control valve, and a third port. The second fluid control valve further includes a valve member movable between a first seat in which the valve member seals the third port and permits fluid communication between the first and second ports and a second seat in which the valve member seals the first port and permits fluid communication between the second and third ports. The third port is configurable as any of a supply port through which fluid is delivered to the fluid chamber of the relay valve and an exhaust port through which fluid from the fluid chamber of the relay valve is exhausted.

A traction valve in accordance with the present invention is advantageous because it permits the integration of multiple valves within a fluid network while also permitting varied functionality. As a result, on-vehicle packaging of the fluid network is improved and potential disruptions to the fluid network are reduced by the elimination of certain fluid conduits and connectors. Moreover, these advantages are achieved while providing a valve having multiple functional configurations thereby providing increased flexibility in design and a reduction in functionally specific parts.

These and other advantages of this invention will become apparent to one skilled in the art from the following detailed description and the accompanying drawings illustrating features of this invention by way of example.

DETAILED DESCRIPTION OF EMBODIMENTS OF THE INVENTION

Figure 1:
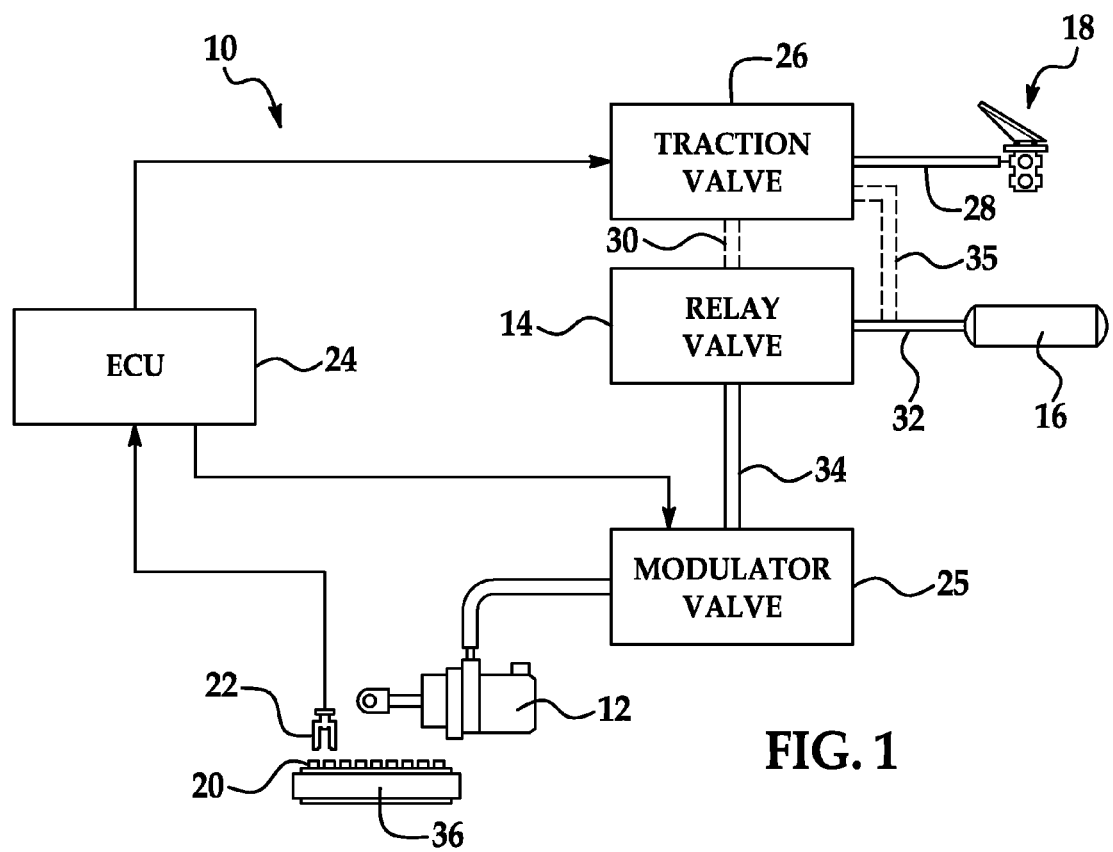
FIG. 1 is a diagrammatic representation of a traction control braking system incorporating a traction relay valve in accordance with the present invention.

Referring now to the drawings wherein like reference numerals are used to identify identical components in the various views, FIG. 1 illustrates a brake system 10 in accordance with one embodiment of the present invention. System 10 is particularly adapted for use in heavy trucks. It should be understood, however, that system 10 may be used on a wide variety of vehicles. System 10 may include one or more service brakes 12 (represented by service brake chambers shown in FIG. 1), a relay valve 14, a fluid reservoir 16, a service brake pedal valve 18 and a traction control system including a tone ring 20, speed sensor 22, electronic control unit (ECU) 24, a modulator valve 25, and a traction valve 26 in accordance with the present invention. System 10 may be used in anti-lock braking systems (ABS), electronic braking systems (EBS) and electronic stability control systems (ESC or ESP).

Service brakes 12 are provided to apply a braking force to the wheels of the vehicle and are conventional in the art. Brakes 12 may comprise conventional drum or disk brakes and are actuated and controlled by fluid pressure provided through the service brake chambers and a network of fluid conduits and valves including, for example, conduits 28, 30, 32, 34, 35 and valves 14, 18, 25 and 26.

Relay valve 14 increases the volume of fluid, and therefore the speed, at which fluid is delivered to, and exhausted from, brakes 12 when brakes 12 are located at a relatively large distance from a fluid source in order to eliminate lag times between the commanded and actual application and release of brakes 12. Relay valve 14 draws fluid from a fluid source such as reservoir 16 and is typically used on rear axle service brakes in heavy trucks, but may be used on service brakes associated with any vehicle axle including the front axle.

Fluid reservoir 16 provides a source of compressed or pressurized fluid for the application of brakes 12. Reservoir 16 is conventional in the art.

Service brake pedal valve 18 is provided to allow controlled application of the brakes 12 by the vehicle operator by selectively releasing fluid pressure from a fluid reservoir such as reservoir 16. Pedal valve 18 is conventional in the art.

Tone ring 20 is coupled to a wheel 36 and provides an indication of the position of the wheel 36 for use by sensor 22. Tone ring 20 is conventional in the art and may comprise a toothed ring that is mounted for rotation with wheel 36.

Sensor 22 is provided to generate a signal indicative of the speed of wheel 36. Sensor 22 may comprise a magnetic sensor mounted on the vehicle proximate to the tone ring 20. Movement of the teeth of tone ring 20 through a magnetic field generated by sensor 22 induces a current in sensor 22 that is proportional to the speed of wheel 36.

Electronic control unit (ECU) 24 is provided to control modulator valve 25 and traction valve 26. ECU 24 may comprise a programmable microprocessor or microcontroller or may comprise an application specific integrated circuit (ASIC). ECU 24 may include a central processing unit (CPU) and an input/output (I/O) interface through which ECU 24 may receive a plurality of input signals including signals generated by sensor 22 and signals indicative of application of the accelerator by the operator and generate a plurality of output signals including those used to control modulator valve 25 and traction valve 26.

Modulator valve 25 controls the delivery of fluid pressure to, and the exhaust of fluid pressure from, the service brake chambers of brakes 12. Valve 25 is conventional in the art and may comprise one or more solenoids controlled responsive to ECU 24.

Figure 2:
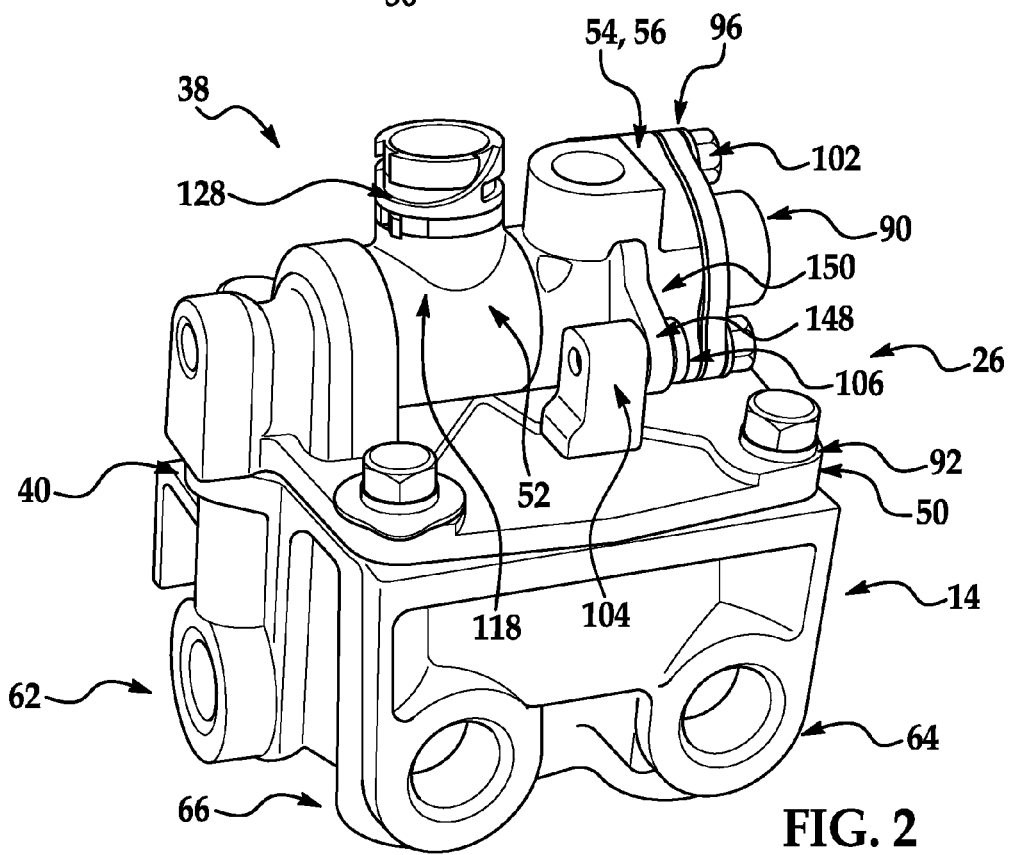
FIG. 2 is a perspective view of a traction relay valve incorporating a cover assembly in accordance with the present invention.
Figure 3:
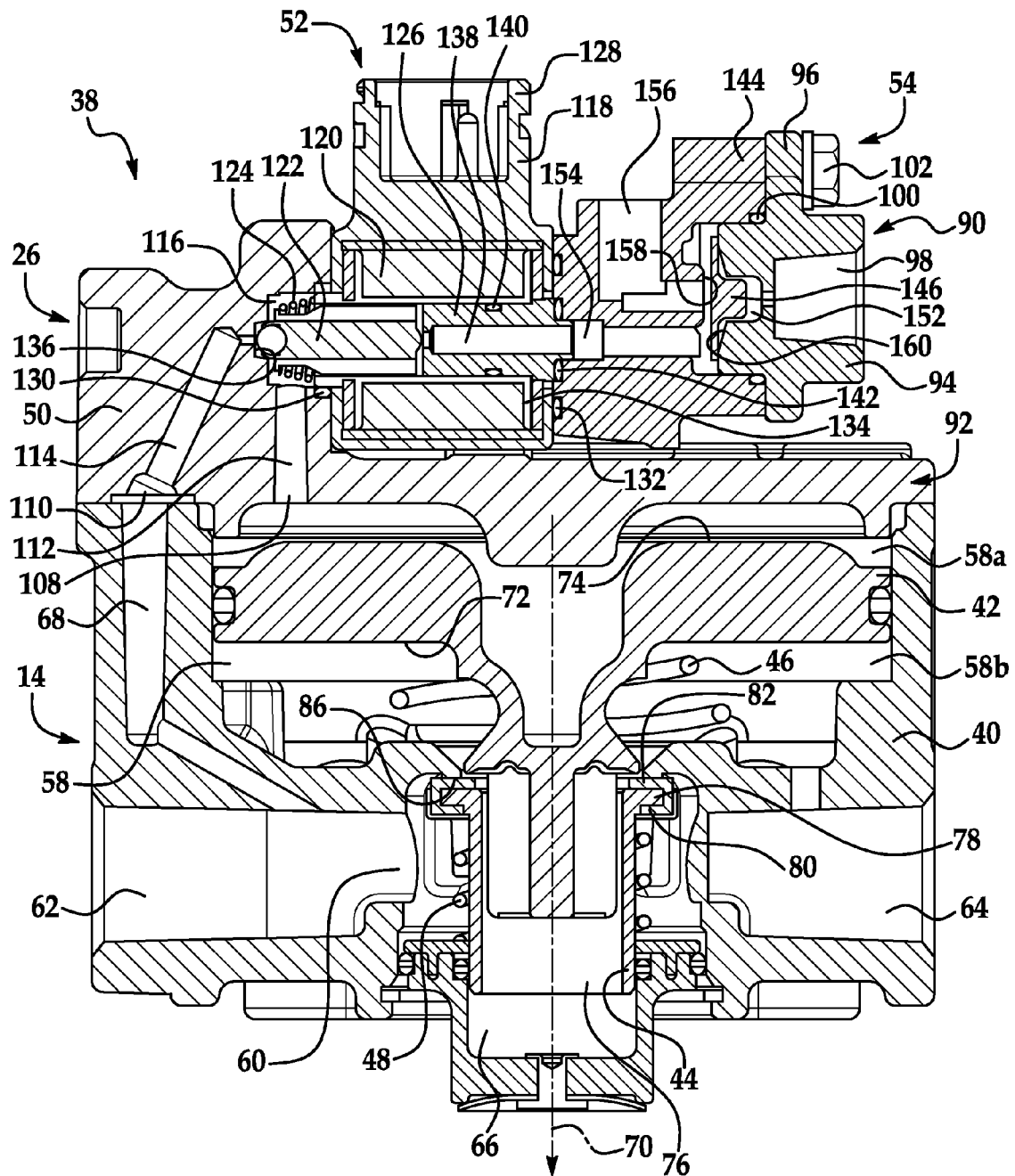
FIG. 3 is a cross-sectional view of the traction relay valve of FIG. 2 in which the cover assembly includes a fluid control valve configured to supply fluid pressure to a fluid chamber of the traction relay valve.
Figure 4:
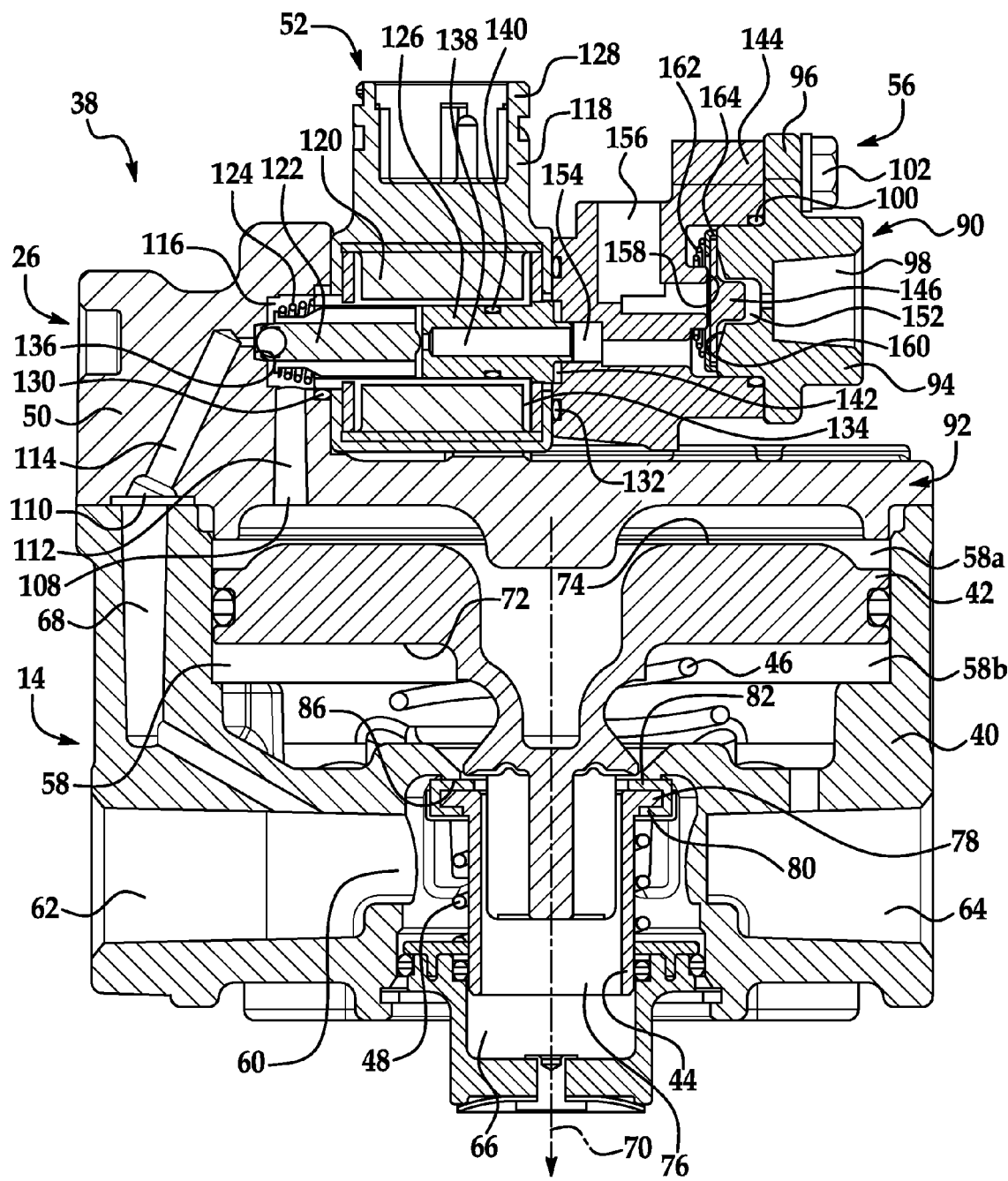
FIG. 4 is a cross-sectional view of the traction relay valve of FIG. 2 in which the cover assembly includes a fluid control valve configured to exhaust fluid pressure from a fluid chamber of the traction relay valve.

Traction valve 26 provides traction control (differential braking) by providing controlled delivery of fluid to service brakes 12 during traction control events such as when the torque commanded by the driver is too great for given road surface conditions. In response to a signal from ECU 24, traction valve 26 permits fluid from a fluid source such as reservoir 16 to flow to brakes 12 and to appropriate modulator valves 25 controlled by ECU 24 in order to actuate brakes 12. Traction valve 26 is in fluid communication with relay valve 14. As illustrated in FIGS. 2-4 and described in greater detail hereinbelow, traction valve 26 may be physically integrated with relay valve 14 to form a traction relay valve. Alternatively, traction valve 26 may be remote from relay valve 14 and connected by a fluid conduit 30 (in which case traction valve 26 would also be connected directly to reservoir 16 by fluid conduit 35). In accordance with the present invention and as discussed in greater detail below, traction valve 26 further incorporates any of a plurality of additional interchangeable fluid control valves to provide varied functionality to traction valve 26.

Referring now to FIGS. 2-4, a traction relay valve 38 in accordance the present invention will be described. Valve 38 combines the structure and function of relay valve 14 and traction valve 26 into a single physically integrated valve with the traction valve 26 forming a cover assembly for the housing 40 of relay valve 14. In addition to housing 40, the relay valve 14 portion of valve 38 may include valve members 42, 44, and means, such as springs 46, 48, for biasing valve members 42, 44 in one direction. The traction valve 26 portion of valve 38 may include a body 50 and a fluid control valve 52 for use in traction control. In accordance with the invention, the traction valve 26 portion may further include any of a plurality of additional interchangeable fluid control valves having different functions to provide varying functional configurations for traction valve 26. In the embodiment illustrated in FIG. 3, traction valve 26 includes a "quick release" fluid control valve 54. In the embodiment illustrated in FIG. 4, traction valve 26 includes a "double check" fluid control valve 56. It should be understood, however, that the illustrated fluid control valves 54, 56 are exemplary only and that valves having different functionality could alternatively be used in traction control valve 26 to provide additional configurations to valve 26 and traction relay valve 38.

Housing 40 defines a fluid manifold to route fluid between various fluid sources and destinations. Housing 40 defines a pair of fluid chambers 58, 60, and a plurality of ports including a supply port 62, one or more delivery ports 64 and an exhaust port 66. Housing 40 also defines a fluid passage 68 leading from chamber 60 for a purpose described hereinbelow. Housing 40 may be made from conventional metals and metal alloys and non-metallics. Supply port 62 and delivery ports 64 may be coupled to reservoir 16 and brakes 12, respectively, through conventional fluid conduits 32, 34 (see FIG. 1).

Valve members 42, 44 and springs 46, 48 are provided to control the delivery of fluid to, and the exhaust of fluid from, service brakes 12. Valve member 42 may comprise a piston disposed within fluid chamber 58 (dividing fluid chamber 58 into two parts 58a, 58b on opposite sides of piston 42) and disposed about an axis 70. Member 42 may move along axis 70 within chamber 58 in either axial direction. Spring 46 is disposed on one side 72 of valve member 42 and biases valve member 42 in one axial direction (upward in FIG. 3). Fluid pressure on an opposite side 74 of valve member 42 urges valve member 42 in the opposite axial direction against the bias of spring 46. Valve member 44 may comprise a generally cylindrical member disposed within fluid chamber 60 and coaxial with valve member 42. Member 44 defines a central exhaust passage 76 and a radially outwardly extending flange 78 at one axial end. Flange 78 forms a spring seat on one axial side 80 for engagement by spring 48 and a valve seat on the opposite axial side 82 for engagement by member 42. Member 44 may move along axis 70 within chamber 60 in either axial direction. Spring 48 is disposed on side 80 of flange 78 of valve member 44 and biases valve member 44 in one axial direction (upwards in FIG. 3) towards a valve seat 86 formed in housing 40. Fluid pressure and/or a force imparted by movement of valve member 42 on side 82 of flange 78 of valve member 44 urges valve member 44 against the bias of spring 48.

During normal braking, the vehicle operator will apply force to the brake pedal valve 18 causing the delivery of fluid pressure through the traction valve 26 portion of valve 38 to portion 58a of fluid chamber 58. Fluid pressure that builds on side 74 of valve member 42 will cause movement of valve member 42 against the biasing force of spring 46 (downward in FIG. 3). Valve member 42 engages side 82 of valve member 44 thereby sealing the exhaust passage 76 of valve member 44. Valve member 42 also urges valve member 44 to move against the biasing force or spring 48 and off of valve seat 86 in housing 40 thereby opening a fluid passage between supply port 62 and delivery port 64. As fluid flows from supply port 62 to delivery port 64 (through portion 58b of chamber 58 with which delivery port 64 is in fluid communication), the fluid pressure increases on side 72 of valve member 42. Once the pressure above and below valve member 42 is equal, member 42 ceases to exert a force against member 44. The biasing force of spring 48 then urges member 44 to reengage valve seat 86 in housing 40 to close the fluid path from supply port 62 to delivery port 64. Exhaust passage 76 remains closed due to the continued engagement between members 42, 44. When the vehicle operator releases brake pedal valve 18, fluid is exhausted from portion 58a of chamber 58 and fluid pressure acting on side 74 of valve member 42 is reduced. Fluid pressure on side 72 of valve member 42 causes further upward movement of valve member 42 thereby unseating valve member 42 from flange 78 of valve member 44 and opening exhaust passage 76 to exhaust fluid between relay valve 14 and brakes 12 (or at least between relay valve 14 and brake modulator valve 25 disposed between relay valve 14 and brakes 12).

Referring again to FIG. 2, body 50 of traction valve 26 provides structural support for valves 52 and 54 or 56 and means for positioning and orienting valves 52 and 54 or 56 relative to one another. In the illustrated embodiment, body 50 also forms part of a cover assembly that encloses portion 58a of fluid chamber 58 of relay valve 14 (see FIG. 3). Body 50 is divided into two portions 90, 92, separated by fluid control valves 52 and 54 or 56. Each of portions 90, 92 may be cast from conventional metals and metal alloys.

Portion 90 of body 50 is an annular member with a substantially cylindrical body 94 and a generally diamond shaped flange 96 extending radially therefrom. Body 94 defines an inlet port 98 extending therethrough and may, for example, be coupled to brake pedal valve 18 using conventional fluid conduits and connectors. Referring to FIGS. 3 and 4, the portion of body 94 disposed on one side of flange 96 may extend into a chamber in valve 54 or 56 sized to receive body 94 and a seal 100 may be disposed between the outer diameter of body 94 and the inner diameter of the chamber to prevent fluid leakage. Referring again to FIG. 2, conventional fasteners 102 such as screws, bolts, pins, welds, or adhesives may be used to couple flange 96 to a mating portion of valve 54 or 56.

Portion 92 of body 50 is configured to enclose portion 58a of fluid chamber 58 in housing 40. Referring again to FIG. 2, in the illustrated embodiment, portion 92 has a generally rectilinear shape. It should be understood, however, that the size and shape of portion 92 may vary relative to the size and shape of housing 40 and portion 58a of fluid chamber 58 of relay valve 14 and relative to the size and shape of valves 52, 54, 56. Portion 92 may be coupled to housing 40 using conventional fasteners such as screws, bolts, pins, welds or adhesives. Portion 92 also includes means, such as posts 104, for attaching fluid valves 54, 56 to body 50. In particular, conventional fasteners 106 such as screws, bolts, pins, welds, or adhesives may be used to couple a flange extending from valve 54 or 56 to posts 104. Posts 104 may also function as a means for attaching portion 90 of body 50 to portion 92 of body 50 in applications where fluid valves 54 and 56 are unneeded (e.g. by connecting flange 96 of portion 90 of body 50 to posts 104 using similar fasteners) further increasing the versatility of traction valve 26 and traction relay valve 38. It should be understood that the form of attachment means may vary and that valve 54 or 56 (or portion 90 of body 50) may be coupled to portion 92 of body 50 in a variety of ways.

Referring to FIGS. 3 and 4, portion 92 of body 50 defines an outlet port 108 and a traction supply port 110. Outlet port 108 and traction supply port 110 are disposed at one end of corresponding fluid passages 112, 114 formed in portion 92 of body 50 and extending from a common fluid chamber 116 formed in portion 92 of body 50. Outlet port 108 terminates at, and is in fluid communication with, portion 58a of fluid chamber 58 of relay valve 14. Traction supply port 110 terminates at, and is in fluid communication with, fluid passage 68 in housing 40 upon assembly of body 50 to housing 40.

Fluid control valve 52 provides a means for controlling the application of brakes 12 to provide traction control. Valve 52 is conventional in the art and may comprise a solenoid valve. Valve 52 includes a housing 118, a conductor 120, a valve member 122, a spring 124 and a pole piece 126.

Housing 118 provides structural support for the other components of valve 52. Referring to FIG. 2, housing 118 has a generally cylindrical body with a cylindrical connector 128 extending therefrom for connection to ECU 24. Housing 118 is disposed between fluid control valve 54 or 56 and portion 92 of body 50 (specifically the part of portion 92 forming fluid chamber 116 and passages 112, 114). Referring to FIGS. 3 and 4, seals 130, 132 may be disposed at either axial end of housing 118 between housing 118 and body 50 and between housing 118 and valve 54 or 56.

Conductor 120 provides a means for generating magnetic flux and creating a magnetic circuit within valve 52. Conductor 120 is conventional in the art and may comprise a coil wound upon a bobbin 134 and supported within housing 118.

Valve member 122 provides a means for selectively permitting fluid communication between traction supply port 110 and output port 108. Member 122 may comprise an armature and is configured to move between a position preventing fluid communication between traction supply port 110 and outlet port 108 and a position permitting fluid communication between ports 110, 108. One axial end of member 122 is urged against a valve seat 136 formed in portion 92 of body 50 at the intersection of fluid passage 114 and fluid chamber 116 by spring 124 to prevent fluid communication between traction supply port 110 and outlet port 108.

Spring 124 biases valve member 122 towards valve seat 136 to prevent fluid communication between ports 110, 108. Spring 124 is conventional in the art.

Pole piece 126 forms part of a magnetic circuit used to selectively urge valve member 122 away from valve seat 136 against the biasing force of spring 124 to permit fluid communication between ports 110, 108. Pole piece 126 is aligned with member 122. One axial end of pole piece 126 is proximate member 122. In accordance with one aspect of the present invention, an opposite axial end of pole piece 126 may extend axially outward from housing 118 of valve 52 and be received within a corresponding opening in valve 54 or 56 sized to receive pole piece 126. The extension of pole piece 126 into valve 54 or 56 improves the alignment of valve 52 thereby preventing displacement of seals within valve 52 and valve failure due to unintended displacement of valve member 122. Pole piece 126 also defines a fluid passage 138 therethrough that permits fluid to flow from inlet port 98 to outlet port 108 when conductor 120 is not energized. Upon energization of conductor 120, a magnetic circuit attracts member 122 towards pole piece 126. Upon engagement of member 122 and pole piece 126, fluid passage 138 is sealed to prevent fluid communication between inlet port 98 and outlet port 108 while fluid passage 114 is opened to permit fluid communication between traction supply port 110 and outlet port 108. Pole piece 126 may define a circumferential groove disposed intermediate its axial ends and configured to receive a seal 140 disposed between the outer diameter of pole piece 126 and the inner diameter of the bobbin 134 for conductor 120. In addition, a seal 142 may be disposed between one axial end face of pole piece 126 and valve 54 or 56.

Referring now to FIG. 3, fluid control valve 54 provides a quick release feature for exhausting fluid pressure from portion 58a of fluid chamber 58. Valve 54 includes a housing 144 and a valve member 146. Referring to FIG. 2, the outer surface of housing 144 defines a outwardly extending flange 148 configured for attachment to posts 104 in portion 92 of body 50 using fasteners 106 and another outwardly extending flange 150 configured for attachment to flange 96 of portion 92 of body 50 using fasteners 102. Referring again to FIG. 3, housing 144 defines several ports 152, 154, 156. Port 152 is configured for fluid communication with inlet port 98 in portion 90 of body 50. Port 154 is configured for communication with outlet port 108 of body 50 through passage 138 in pole piece 126 of fluid control valve 52. As discussed above, in accordance with one aspect of the invention, port 154 may be sized to receive one axial end of pole piece 126 to aid in aligning valve 52 and its components. Port 156 is configured to exhaust fluid from portion 58a of fluid chamber 58. By exhausting fluid from portion 58a of chamber 58 using valve 54—as opposed to, for example, a valve nearer to brake pedal valve 18—the release time for brakes 12 is reduced. Although the illustrated embodiment orients port 156 and exhausts fluid in a particular direction (upward in FIG. 3), in a further refinement of the invention port 156 may be oriented to exhaust fluid in other directions. In particular, housing 144 may be configured such that port 156 is rotated, and fluid is exhausted, approximately 90 degrees from the illustrated position to further improve packaging of traction relay valve 38. As noted, hereinabove, seals 100, 132, 142, may be disposed between housing 144 and portion 90 of body 50, housing 118 of valve 52, and pole piece 126 of valve 52, respectively, to prevent fluid leakage. Valve member 146 may comprise a conventional deformable diaphragm and is movable between a seat 158 in housing 144 in which member 146 seals port 156 and permits fluid communication between ports 152, 154 (e.g., to permit fluid to flow from inlet port 98 in body 50 to outlet port 108 in body 50) and a seat 160 in portion 90 of body 50 in which member 146 seals port 152 and permits fluid communication between ports 154, 156 (e.g., to exhaust fluid from fluid chamber 58).

Referring now to FIG. 4, traction relay valve 38 is illustrated with valve 56 substituted for valve 54. As stated hereinabove, traction valve 26 is configured to receive a plurality of interchangeable fluid control valves such as valves 54, 56 having different functions thereby enabling valve 26 (and valve 38) to assume a variety of configurations. Valve 56 comprises a double check valve used to direct fluid from either of two sources depending on which source is at a higher pressure. Valve 56 may be substantially similar to valve 54 including having the same housing 144 thereby helping to facilitate the interchangeability of valves 54, 56. Valve 56 differs from valve 54 in that valve 56 includes a spring 162 bearing against a washer 164 that contacts valve member 146 and biasing valve member 146 against valve seat 160. Further, port 156 is configured to supply fluid to portion 58a of fluid chamber 58 rather than exhaust fluid from portion 58a of chamber 58 as in valve 54.

As is apparent from the embodiments shown in FIGS. 3 and 4, although valves 54, 56 provide different functions, valves 54, 56, are interchangeable with body 50 and valve 52. Body 50 and valve 52 are configured to receive either of valves 54, 56 between inlet port 98 in portion 90 of body 50 and valve 52. Because each of valves 54, 56 provides a different function, the inventive traction valve 26 or traction relay valve 38 can assume a plurality of configurations upon assembly of the valves 54, 56 to body 50 and valve 52. The invention therefore provides flexibility in design and a reduction in functionally specific parts. Further, the invention permits the integration of multiple valves within a fluid network while also permitting varied functionality. The physical integration of the valves improves on-vehicle packaging for the fluid network and reduces potential disruptions to the fluid network by the elimination of certain fluid conduits and connectors.

While the invention has been shown and described with reference to one or more particular embodiments thereof, it will be understood by those of skill in the art that various changes and modifications can be made without departing from the spirit and scope of the invention.

We claim:

1. A traction valve, comprising:
   a body defining an inlet port, an outlet port, and a traction supply port, said outlet port configured for fluid communication with a fluid chamber defined in a housing of a relay valve;
   a first fluid control valve supported on said body, said first fluid control valve including a valve member configured to move between a first position preventing fluid communication between said traction supply port and said outlet port and a second position permitting fluid communication between said traction supply port and said outlet port;
   wherein said body and said first fluid control valve are configured to receive any of a plurality of interchangeable second fluid control valves between said inlet port in said body and said first fluid control valve, each of said plurality of interchangeable second fluid control valves configured to perform a different function such that said traction valve assumes a first configuration upon assembly of one valve of said plurality of interchangeable second fluid control valves with said body and said first fluid control valve and a second configuration, different from said first configuration, upon assembly of another valve of said plurality of interchangeable second fluid control valves with said body and said first fluid control valve
   wherein said body includes a first portion having means for attaching each of said plurality of interchangeable second fluid control valves to said body and a second portion defining said inlet port, said second portion configured for attachment to each of said plurality of interchangeable second fluid control valves.

2. The traction valve of claim 1 wherein said first fluid control valve comprises a solenoid valve and said valve member comprises an armature.

3. The traction valve of claim 2 wherein said first fluid control valve includes a pole piece aligned with said armature and defining a fluid passage therethrough, said pole piece having a first end proximate said armature and a second end, opposite said first end, configured to be received within an opening, sized to receive said second end of said pole piece, in each of said plurality of interchangeable second fluid control valves.

4. The traction valve of claim 1 wherein said one valve of said plurality of interchangeable second fluid control valves includes:
a housing defining a first port configured for fluid communication with said inlet port of said body; a second port configured for fluid communication with said outlet port of said body through said first fluid control valve, and a third port configured to supply fluid to said fluid chamber of said relay valve; and,
a valve member movable between a first seat in which said valve member seals said third port and permits fluid communication between said first and second ports and a second seat in which said valve member seals said first port and permits fluid communication between said second and third ports.

5. The traction valve of claim 4 wherein said another valve of said plurality of interchangeable second fluid control valves includes:
a housing defining a first port configured for fluid communication with said inlet port of said body; a second port configured for fluid communication with said outlet port of said body through said first fluid control valve, and a third port configured to exhaust fluid from said fluid chamber of said relay valve; and,
a valve member movable between a first seat in which said valve member seals said third port and permits fluid communication between said first and second ports and a second seat in which said valve member seals said first port and permits fluid communication between said second and third ports.

6. The traction valve of claim 1 wherein said one valve of said plurality of interchangeable second fluid control valves includes:
a housing defining a first port configured for fluid communication with said inlet port of said body; a second port configured for fluid communication with said outlet port of said body through said first fluid control valve, and a third port configured to exhaust fluid from said fluid chamber of said relay valve; and,
a valve member movable between a first seat in which said valve member seals said third port and permits fluid communication between said first and second ports and a second seat in which said valve member seals said first port and permits fluid communication between said second and third ports.

7. The traction valve of claim 1 wherein said body is configured to enclose a portion of said fluid chamber of said relay valve.

8. A traction valve, comprising:
a body defining an inlet port, an outlet port, and a traction supply port, said outlet port configured for fluid communication with a fluid chamber defined in a housing of a relay valve;
a first fluid control valve supported on said body, said first fluid control valve including a valve member configured to move between a first position preventing fluid communication between said fraction supply port and said outlet port and a second position permitting fluid communication between said traction supply port and said outlet port;
a second fluid control valve disposed between said body and said first fluid control valve, said second fluid control valve comprising:
a housing defining a first port configured for fluid communication with said inlet port of said body, a second port configured for fluid communication with said outlet port of said body through said first fluid control valve, and a third port; and,
a valve member movable between a first seat in which said valve member seals said third port and permits fluid communication between said first and second ports and a second seat in which said valve member seals said first port and permits fluid communication between said second and third ports
wherein said third port is configurable as any of a supply port through which fluid is delivered to said fluid chamber of said relay valve and an exhaust port through which fluid from said fluid chamber of said relay valve is exhausted.

9. The traction valve of claim 8 wherein said body includes a first portion having means for attaching said second fluid control valve to said body and a second portion defining said inlet port, said second portion configured for attachment to said second fluid control valve.

10. The traction valve of claim 8 wherein said first fluid control valve comprises a solenoid valve and said valve member of said first fluid control valve comprises an armature.

11. The cover assembly of claim 10 wherein said first fluid control valve includes a pole piece aligned with said armature and defining a fluid passage therethrough, said pole piece having a first end proximate said armature and a second end, opposite said first end, configured to be received within an opening, sized to receive said second end of said pole piece, in said second fluid control valve.

12. A traction relay valve for a fluid actuated brake, comprising:
a housing defining a fluid chamber, a supply port, a delivery port and an exhaust port;
a valve member disposed within said housing and movable in a first direction and a second direction, opposite said first direction;
a spring disposed on one side of said valve member and biasing said valve member in said first direction, delivery of fluid on a second side of said valve member urging said valve member in said second direction and permitting fluid communication between said delivery port and said supply port, removal of fluid from said second side of said valve member permitting fluid communication between said supply port and said exhaust port; and,
a cover assembly, comprising:
a body configured for connection to said housing, said body defining an inlet port, an outlet port, and a traction supply port, said outlet port in fluid communication with said fluid chamber;
a first fluid control valve supported on said body, said first fluid control valve including a valve member configured to move between a first position preventing fluid communication between said fraction supply port and said outlet port and a second position permitting fluid communication between said traction supply port and said outlet port;
wherein said body and said first fluid control valve are configured to receive any of a plurality of interchangeable second fluid control valves between said inlet port in said body and said first fluid control valve, each of said plurality of interchangeable second fluid control valves configured to perform a different function such that said cover assembly assumes a first configuration upon assembly of one valve of said plurality of interchangeable second fluid control valves with said body and said first fluid control valve and a second configuration, different from said first configuration, upon assembly of another valve of said plurality of interchangeable second fluid control valves with said body and said first fluid control valve wherein said body includes a first portion having means for attaching each of said plurality of interchangeable second fluid control valves to said body and a second portion defining said inlet port, said second portion configured for attachment to each of said plurality of interchangeable second fluid control valves.

13. The traction relay valve of claim 12 wherein said first fluid control valve comprises a solenoid valve and said valve member of said first fluid control valve comprises an armature.

14. The traction relay valve of claim 13 wherein said first fluid control valve includes a pole piece aligned with said armature and defining a fluid passage therethrough, said pole piece having a first end proximate said armature and a second end, opposite said first end, configured to be received within an opening, sized to receive said second end of said pole piece, in each of said plurality of interchangeable second fluid control valves.

15. The traction relay valve of claim 12 wherein said one valve of said plurality of interchangeable second fluid control valves includes:
   a housing defining a first port configured for fluid communication with said inlet port of said body; a second port configured for fluid communication with said outlet port of said body through said first fluid control valve, and a third port configured to supply fluid to said fluid chamber; and,
   a valve member movable between a first seat in which said valve member seals said third port and permits fluid communication between said first and second ports and a second seat in which said valve member seals said first port and permits fluid communication between said second and third ports.

16. The traction relay valve of claim 15 wherein said another valve of said plurality of interchangeable second fluid control valves includes:
   a housing defining a first port configured for fluid communication with said inlet port of said body; a second port configured for fluid communication with said outlet port of said body through said first fluid control valve, and a third port configured to exhaust fluid from said fluid chamber; and,
   a valve member movable between a first seat in which said valve member seals said third port and permits fluid communication between said first and second ports and a second seat in which said valve member seals said first port and permits fluid communication between said second and third ports.

17. The traction relay valve of claim 12 wherein said one valve of said plurality of interchangeable second fluid control valves includes:
   a housing defining a first port configured for fluid communication with said inlet port of said body; a second port configured for fluid communication with said outlet port of said body through said first fluid control valve, and a third port configured to exhaust fluid from said fluid chamber; and,
   a valve member movable between a first seat in which said valve member seals said third port and permits fluid communication between said first and second ports and a second seat in which said valve member seals said first port and permits fluid communication between said second and third ports.

* * * * *

UNITED STATES PATENT AND TRADEMARK OFFICE
CERTIFICATE OF CORRECTION

PATENT NO. : 8,869,831 B2
APPLICATION NO. : 13/115660
DATED : October 28, 2014
INVENTOR(S) : Craig S. Haehn, Chris J. Pomear and Charles E. Ross It is certified that error appears in the above-identified patent and that said Letters Patent is hereby corrected as shown below:

In the Claims

In column 8, line 37 (claim 1), "fraction" should read "traction".

In column 9, line 61 (claim 8), "fraction" should read "traction".

In column 10, line 55 (claim 12), "fraction" should read "traction".

Signed and Sealed this
Fourteenth Day of April, 2015

Michelle K. Lee
*Director of the United States Patent and Trademark Office*